(12) United States Patent
Ganu et al.

(10) Patent No.: US 9,380,508 B2
(45) Date of Patent: Jun. 28, 2016

(54) SYSTEM, APPARATUS AND METHOD FOR MANAGING NETWORK DEVICE CONNECTIVITY ON HETEROGENOUS NETWORKS

(71) Applicant: Aruba Networks, Inc., Sunnyvale, CA (US)

(72) Inventors: Sachin Ganu, San Jose, CA (US); Partha Narasimhan, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 7 days.

(21) Appl. No.: 14/065,343

(22) Filed: Oct. 28, 2013

(65) Prior Publication Data

US 2015/0119035 A1    Apr. 30, 2015

(51) Int. Cl.
*H04W 36/00* (2009.01)
*H04W 36/30* (2009.01)
*H04W 36/22* (2009.01)

(52) U.S. Cl.
CPC .............. *H04W 36/30* (2013.01); *H04W 36/22* (2013.01)

(58) Field of Classification Search
CPC ...................................................... H04W 36/30
USPC ................ 455/453, 432.1, 435.1, 435.2, 434, 455/436–443; 370/331
See application file for complete search history.

(56) References Cited

U.S. PATENT DOCUMENTS

| | | | |
|---|---|---|---|
| 7,929,508 B1 | 4/2011 | Yucek et al. | |
| 7,948,953 B2 | 5/2011 | Melkote et al. | |
| 8,401,554 B2 | 3/2013 | Melkote et al. | |
| 8,483,169 B2 | 7/2013 | Melkote et al. | |
| 2005/0130650 A1* | 6/2005 | Creamer et al. | 455/432.1 |
| 2006/0128392 A1 | 6/2006 | Turina et al. | |
| 2007/0104126 A1 | 5/2007 | Calhoun et al. | |
| 2007/0201404 A1* | 8/2007 | Cheon et al. | 370/331 |
| 2007/0249386 A1 | 10/2007 | Bennett | |
| 2008/0070586 A1* | 3/2008 | Kermoal et al. | 455/452.2 |
| 2008/0261602 A1* | 10/2008 | Livneh | 455/442 |
| 2008/0318576 A1* | 12/2008 | So et al. | 455/436 |
| 2009/0070694 A1* | 3/2009 | Ore et al. | 715/764 |
| 2010/0322198 A1 | 12/2010 | Friday et al. | |
| 2011/0096738 A1 | 4/2011 | Choi | |
| 2011/0292898 A1 | 12/2011 | Wu et al. | |
| 2012/0282968 A1* | 11/2012 | Toskala | H04W 24/10 455/517 |
| 2013/0036188 A1 | 2/2013 | Ganu et al. | |

(Continued)

OTHER PUBLICATIONS

Non-Final Office Action in U.S. Appl. No. 13/195,720 dated Feb. 8, 2013. 16 pages.

(Continued)

*Primary Examiner* — Mong-Thuy Tran
(74) *Attorney, Agent, or Firm* — Hewlett Packard Enterprise Patent Department

(57) ABSTRACT

According to one embodiment of the disclosure, a network device is described that includes at least one hardware processor and is configured to perform a number of operations. Some of these operations include receiving information associated with a level of connectivity by a client device to a first network, and receiving information associated with a level of connectivity by the client device to a second network. Based on the level of connectivity with the first network and the level of connectivity with the second network, the second network is selecting for the client device to access one or more resources, and thereafter, causing the client device to connect to the second network.

28 Claims, 9 Drawing Sheets

(56) References Cited

U.S. PATENT DOCUMENTS

| | | | |
|---|---|---|---|
| 2013/0041981 A1* | 2/2013 | Kim | H04W 48/16 709/217 |
| 2013/0265943 A1 | 10/2013 | Melkote et al. | |
| 2013/0308447 A1* | 11/2013 | Cheng et al. | 370/230 |
| 2014/0211756 A1* | 7/2014 | Bontu et al. | 370/331 |
| 2015/0172998 A1* | 6/2015 | Tervonen | H04W 48/16 370/254 |

OTHER PUBLICATIONS

Final Office Action in U.S. Appl. No. 13/195,720 dated Aug. 16, 2013. 18 pages.

Non-Final Office Action in U.S. Appl. No. 13/195,720 dated May 8, 2014. 19 pages.

Final Office Action in U.S. Appl. No. 13/195,720 dated Jan. 27, 2015. 19 pages.

\* cited by examiner

| CLIENT MAC 220 | SIGNAL STRENGTH 230 | TIME STAMP 240 | CHANNEL 250 | BAND 260 | SESSION TYPE 270 | APPLICATION TYPE 280 | EDGE DEVICE SPECIFIC INFORMATION 290 | CLIENT TABLE 200 |
|---|---|---|---|---|---|---|---|---|
| ... | ... | ... | ... | ... | ... | ... | ... | |

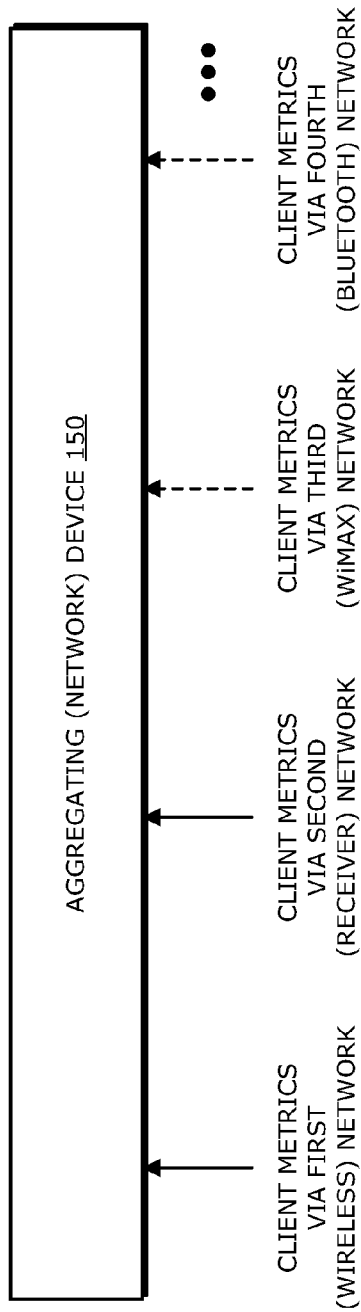
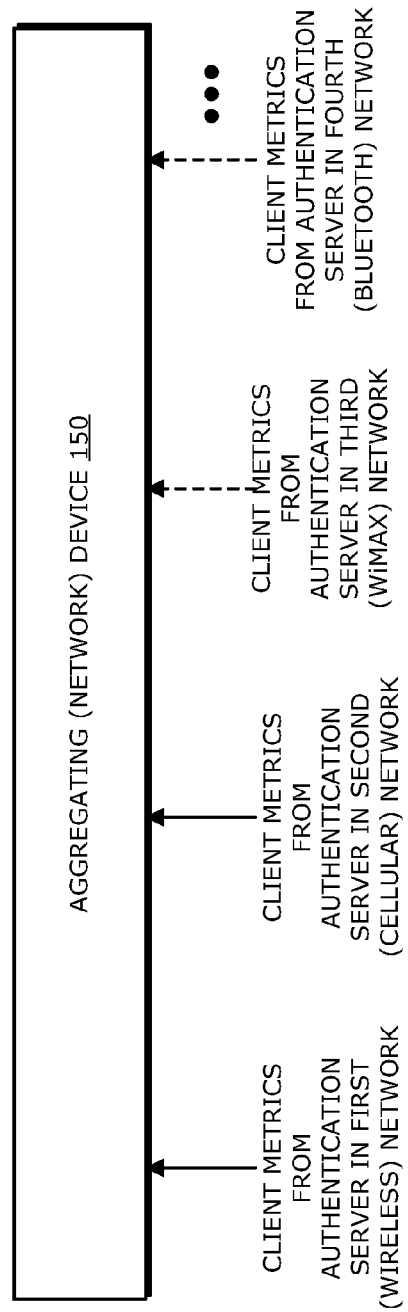
FIG. 3A
FIG. 3B

| TRIGGERING EVENTS | ILLUSTRATIVE COMPUTATIONS | |
|---|---|---|
| SIGNAL STRENGTH | 1. SNR < FIRST THRESHOLD<br>2. RSSI < SECOND THRESHOLD | 500 |
| LINK CHARACTERISTICS | 1. MEASUREMENT METRIC < THIRD THRESHOLD<br>METRIC = AIRTIME BASED IN LINK SPEED; NO. OF RETRIES; LINK DELAY | 510 |
| SESSION TYPE | 1. DOES SESSION REQUIRE QoS THAT CANNOT BE CONSISTENTLY SUPPORTED BY THE CURRENT NETWORK<br>2. TYPE: VIDEO; AUDIO; DATA; IMAGES | 520 |
| CAPACITY | 1. BANDWIDTH AVAILABLE BEHIND EDGE DEVICE ≥ BANDWIDTH NEEDED BY THE CLIENT DEVICE | 530 |
| LOAD | 1. MAX # NETWORK DEVICES ≥ FOURTH THRESHOLD<br>N: MOBILE NETWORK DEVICE CAN ACCESS NETWORK<br>Y: (1) MOBILE NETWORK DEVICE TO CONNECT TO DIFFERENT NETWORK<br>(2) MOBILE NETWORK DEVICE TO CONNECT TO NETWORK PROVIDED ANOTHER NETWORK DEVICE IS DROPPED | 540 |
| APPLICATION TYPE | 1. MOBILE NETWORK DEVICE INFLUENCED TO:<br>- CONNECT (OR REMAIN CONNECTED) TO A SECOND NETWORK FOR NETWORK TRAFFIC PRODUCED BY A LATENCY-SENSITIVE APPLICATION<br>- CONNECT (OR REMAIN CONNECTED) TO THE FIRST NETWORK FOR A NON-LATENCY SENSITIVE APPLICATION<br>2. MOBILE NETWORK DEVICE IS INFLUENCED TO A PARTICULAR NETWORK (e.g., SECOND NETWORK) IF THE APPLICATION IS DIRECTED TO A SPECIFIC FUNCTIONALITY (e.g., TRAVEL OVER A COVERAGE AREA GREATER THAN A PRESCRIBED AREA) | 550 |

SYSTEM, APPARATUS AND METHOD FOR MANAGING NETWORK DEVICE CONNECTIVITY ON HETEROGENOUS NETWORKS

FIELD

Embodiments of the disclosure relate to the field of wireless digital networks. More specifically, one embodiment of the disclosure relates to the management of connectivity between a network device and a plurality of networks, where at least two networks are directed to different technology types.

GENERAL BACKGROUND

Over the last decade, mobile devices have become the primary communications device for users. Given the proliferation of mobile devices along with increased presence of bandwidth intensive applications running on these mobile devices, it has become a significant challenge to meet Quality of Service (QoS) demands on a given network. Such challenges are exacerbated at certain locations, such as populous venues where thousands or tens of thousands of mobile devices are attempting to access the same network. As a result, users of these mobile devices tend to experience frustration caused by significant connection difficulties when attempting to access the network and significant latency issues after access is granted.

It is contemplated that, over the last few years, Wireless Fidelity (WiFi™) hotspots, which operate in accordance with the IEEE 802.11 standard-2012, have gained popularity as a cellular offload to help alleviate any resource limitations present in a particular cellular network. However, the effectiveness of WiFi™ hotspots has not been fully realized because the individual mobile devices are solely responsible for deciding when to switch from cellular to WiFi™ (or vice-versa) and normally deploy communications switching policies that are heavily weighted in staying on the WiFi™ network regardless of the connectivity levels.

Furthermore, as individual mobile devices are currently responsible for deciding when to switch from one network (e.g., cellular) to another network (e.g. WiFi™), it has become quite difficult for network service providers to manage capacity demands. The reason is that the mobile devices are capable of connecting and using different networks, so capacity demands can vary significantly.

What is needed is a framework that enables one or more network devices to dynamically coordinate device connectivity, even on a per session basis, to different heterogeneous networks.

BRIEF DESCRIPTION OF THE DRAWINGS

Embodiments of the invention are illustrated by way of example and not by way of limitation in the figures of the accompanying drawings, in which like references indicate similar elements and in which:

FIG. 2 is an exemplary embodiment of a client table included in one or more edge devices.

FIG. 3A is a first exemplary embodiment of the communicative coupling with the aggregating device of FIG. 1.

FIG. 3B is a second exemplary embodiment of the communicative coupling with the aggregating device of FIG. 1.

FIG. 5 is an exemplary listing of metrics and associated triggering events to cause changes in network connectivity.

DETAILED DESCRIPTION

I. Overview

Figure 1A:
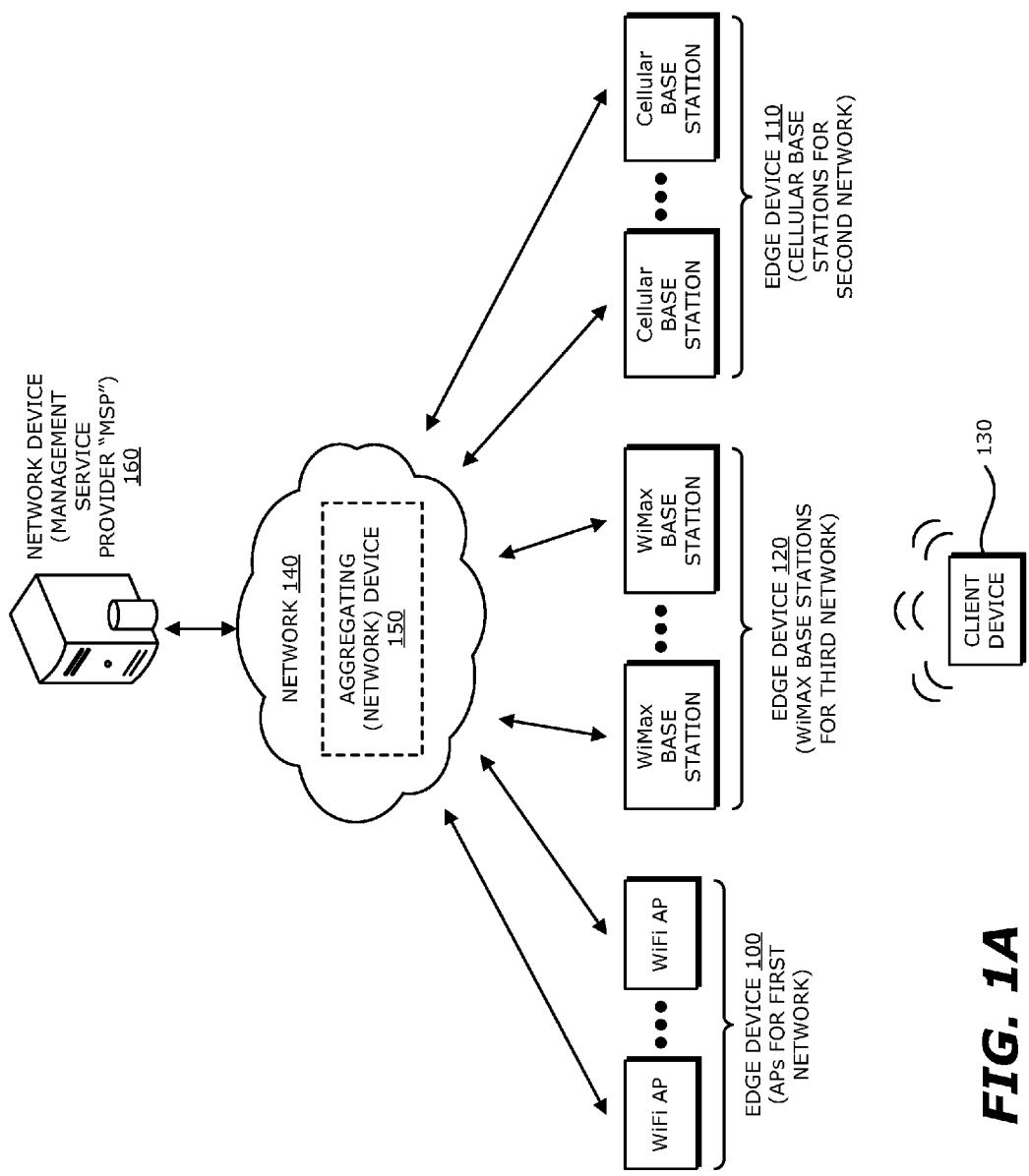
FIG. 1A is an exemplary block diagram of multiple heterogeneous networks with overlapping coverage with a network device controlling client device connectivity.

Embodiments of the disclosure relate to a framework for dynamically managing connectivity to different types of heterogeneous networks with overlapping coverage areas. Examples of different types of heterogeneous networks include, but are not limited or restricted to a first type of wireless (WiFi™) network (representative of an IEEE 802.11-based network), a second type of wireless (WiMax™) network (representative of an IEEE 802.16-based network), a cellular network, and/or a Bluetooth™ network. Partially involved in the control of connectivity to the different types of heterogeneous networks, edge (network) devices may be configured to maintain information obtained from signaling received from the client (network) devices and forward such information to an aggregating (network) device, which subsequently routes the collected information to another network device (sometimes referred to as a "managed service provider (MSP)"). Alternatively, the client device may receive information from one edge device and provide information based on this received information to the MSP via another edge device, where the information is used for management of network connectivity.

In general, the network device (e.g. MSP) manages connectivity to all of the heterogeneous networks. Such management of network connectivity may involve the transmission of one or more message(s) by the network device to different edge devices in order to influence (sometimes referred to as "steer") connectivity of both active and idle client devices to a particular set of networks. These message(s) may be in the form of (1) a blacklist report to the aggregating device which subsequently instructs various edge devices to avoid responding to a request by the client device for establishing a network connection and/or (2) a whitelist report to the aggregating device which subsequently instructs one or more of the edge devices that they are permitted to respond to such connection requests.

Furthermore, the network device may be adapted to partition access to network resources by client devices or to partition access to sets of client devices by certain networks. The partitioning of access by client devices to network resources may be based on network metrics such as capacity and/or load. However, the partitioning of access by networks to sets of client devices may be based on load (e.g. number of client devices) and/or device metrics such as device characteristics (e.g. device type, device manufacturer, radio type, etc.) and/or device capabilities such as transmit/receive speed, installed transport protocol, installed security features, network subscription level, or the like. This partitioning is conducted by the network device in order to optimize overall network performance.

In summary, one embodiment of the disclosure describes a system that is adapted to receive information associated with connectivity levels of a client device to at least a first network and a second network. Where the client device is connected to the first network, namely a data communication path is established between the client device and an edge device of the first network, the connectivity information may include connection metrics, session metrics, application metrics, network metrics, and/or device metrics. One or more of these metrics may be used to formulate a level of connectivity, which is evaluated with the level of connectivity offered by other networks. The results of the evaluation determine whether or not a triggering event has occurred, which denotes that the client device should be steered to establish a connection with another network.

As illustrative examples, the connection metrics may include measured or estimated strength of signaling from the client device, link characteristics such as estimated or measured airtime for transmissions by the client device, or the like. Session metrics are metrics associated with communication sessions conducted by the client device such as the type of data being transmitted, bandwidth usage for the session, and/or QoS requirements for the session. The application metrics are metrics associated with applications running on the client device such as the type of application, a classification of the application (e.g., latency tolerant or intolerant, etc.) or application requirements. Network metrics may include capacity, load (e.g. any granularity—per network, edge device, channel, frequency band, etc.), or other information associated with the first network. Lastly, client device capabilities may include information that identifies the device type and/or features associated with the particular device.

Similarly, as the client device is not connected to the second network, one or more edge devices of the second network may still monitor the air to (i) detect the presence of the client device or (ii) operate to enable the client device to detect the presence of the second network. Herein, the connectivity information may include the measured and/or estimated data from signaling originating from the client device and/or signaling received by the client device and originating from the edge device (e.g. beacon signal strength measurements for example). The application, session, network and/or device metrics may be estimated from monitored communications as well.

Another embodiment of the disclosure describes a system that is adapted with a connection policy for a plurality of networks including at least a first network and a second network, where the first network is a different technology type than the second network. For instance, the first network may be a WiFi™ network and the second network may be a cellular network. In lieu of receipt of connectivity information associated with at least the first network and the second network, the current connectivity of a client device to the first network is determined whether such connectivity is in compliance with the connection policy. Based on results of the analysis of the current connectivity of the client device and the connection policy, the client device may be steered to establish connectivity to the second network.

The following scenario provides an illustrative demonstration of the framework for managing network connectivity for a client device such as a mobile network device for example:
  (1) Mobile network device is registered with the MSP with its current network connection preference(s);
  (2) Mobile network device selects connectivity to a first network for accessing a public network;
  (3) Network device(s), such as the MSP for example, fingerprints the mobile network device (using Organizational Unique Identifier "OUI" or Hypertext Transfer Protocol requests "HTTP requests," etc.) and extracts the device capabilities in terms of whether the mobile network device is capable of establishing connectivity to different types of networks (based on different technologies);
  (4) Network device(s) monitors the quality of the current link between the first network and the mobile network device;
  (5) Network device(s) steers the mobile network device to another network in response to detection of a triggering event (e.g., steering may involve using the corresponding network's inband messages such as an IEEE 802.11v message for Basic Service Set "BSS" transition or the like); and
  (6) Mobile network device is now connected to its "best" network.

Some of the triggering events that are monitored by a network device to determine whether the mobile network device needs to be steered to another type of network may involve one or more of the following metrics: (1) signal strength (e.g., steer a mobile network device to another network based on a comparison of signal strength measurements among the accessible networks and if the current signal strength level falls below a threshold); (2) capacity (e.g., steer mobile network devices towards the network with highest unused network capacity); (3) load (e.g., steer mobile network devices based at least in part on the load on the currently connected network); (4) session type (e.g., steer mobile network devices based at least in part on the type of data to be transmitted/received via the network or the Quality of Service "QoS" level needed; (5) link characteristics (e.g., steer mobile network devices based at least in part on airtime needs); or (6) application type (e.g., steer a mobile network device based at least in part on the type of application(s) running on the mobile network device that identifies specific functionality or latency requirements). For this application layer steering, certain applications that are latency sensitive can be instructed to use a different network as compared to delay tolerant applications.

II. Terminology

Herein, certain terminology is used to describe features within embodiments of the invention. For example, the term "network device" generally refers to electronic equipment configured to communicate over a wired and/or wireless network and process information related to such communications. Hence, the network device may be adapted with circuitry to support wireless connectivity with other network devices being part of a wireless network. Different types of network devices may include, but are not limited to (1) a client device being any consumer electronics with connectivity to multiple networks that are based on different technologies such as cellular, wireless (e.g., WiFi™ or WiMax™), Bluetooth™ or the like; (2) an edge device; and/or (3) a data control device.

Herein, client device may be a stationary network device (e.g., desktop computer, television, set-top box, video gaming console, etc.) or a mobile network device capable of connecting to multiple networks with at least two of such networks having different technologies. Illustrative examples of mobile network devices may include a tablet, laptop, netbook, barcode scanner, a digital camera, and/or a mobile handset such as a smartphone, personal digital assistant "PDA", or the like.

Likewise, illustrative examples of an edge device, which at least partially controls access to a network, may include a wired access port, wireless access port, wireless base station, a cellular base station, or any device configured as a hot spot or gateway for network connectivity. Illustrative examples of a data control device may include, but are not limited or restricted to a network switch, a controller, a router, a brouter, or the like.

An "aggregating device" is a type of data control device that includes hardware circuitry adapted to receive and process information from multiple edge devices for subsequent use in managing wireless association between client devices and edge devices.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "link" is a physical or logical communication path between two or more network devices. Examples of links supporting wireless communications may include certain radio frequency (RF) channels and/or bands or cellular frequency channels and/or bands, as well as the logic associated therewith.

The terms "connected" and "connection" generally relate to an established communication path between two network devices that enables one network device to transfer data targeted specifically for receipt by the other network device. Hence, the "level of connectivity" identifies the link quality level, which may be used to assess whether a particular radio link has properties capable of supporting current sessions and applications running on the client device. The level of connectivity may be determined through analysis of connection metrics, session metrics, application metrics, network metrics and/or device metrics (hereinafter generally referred to as "client metrics").

The term "message" generally refers to information transmitted as information in a prescribed format, where each message may be in the form of a packet, a frame, an Asynchronous Transfer Mode (ATM) cell, or any other series of bits having the prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Figure 1B:
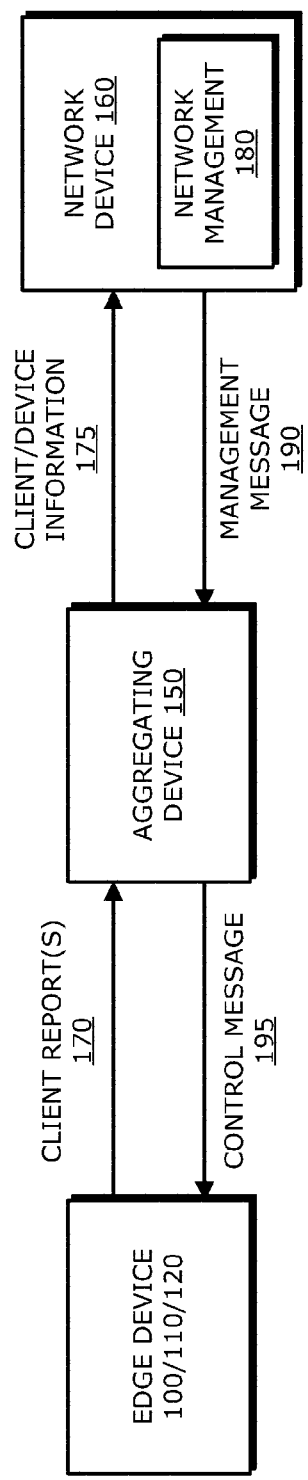
FIG. 1B is an exemplary block diagram of intercommunications between an edge device, an aggregating device and a network device controlling client device connectivity.

According to one embodiment of the disclosure, as shown in FIGS. 1A and 1B, one or more edge devices 100, 110 and/or 120 operate as gateways to control access to different networks that are communicatively coupled to a common, public network such as the Internet. These edge devices 100, 110 and/or 120 may include one or more access points (APs) $100_1$-$100_a$ (where a≥1) that control connectivity to a first wireless (WiFi™) network, one or more cellular base stations $110_1$-$110_b$ (where b≥1) that control connectivity to a cellular network, and/or one or more wireless base stations $120_1$-$120_c$ (where c≥1) that control connectivity to a second wireless (WiMAX™) network. Each of these edge devices 100, 110 and 120 enable a client device 130, such as a mobile network device having capabilities for communicatively coupling with two or more of edge devices 100, 110 and 120 for example, to access public network 140.

According to one embodiment of the disclosure, from one or more edge devices 100, 110 and/or 120, an aggregating device 150 is adapted to receive information associated with client device 130 along with metrics for the networks associated with these edge devices 100, 110 and/or 120. The collected information is provided as client/device information 175 to a network device 160, sometimes referred to as a management service provider (MSP), which is adapted to control the edge devices in order to influence the connectivity of client device 130 to a particular network that may be better suited for its current operating state. Such control may be based on an analysis of client metrics contained within one or more report messages 170 as shown in FIG. 1B.

Referring now to FIG. 1B, a report message is received from one or more of the edge devices associated with different networks, where each report message includes client metrics formulated from signaling from the client device 130 that is received and processed by a particular edge device. For instance, as an illustrative example, a report message 170 comprises client metrics, such as the current signal strength measurement of received messages from client device 130 (e.g., signal-to-noise ratio "SNR", received signal strength indicator "RSSI", or an equivalent signal strength reading) as well as network load (e.g., number of network devices associated with AP $100_1$-$100_a$).

As is understood in the art, each of the edge devices $100_1, \ldots, 100_a, 110_1, \ldots, 110_b, 120_1, \ldots,$ and/or $120_c$ (e.g. AP $100_1$) comprises at least one processor, memory, and multiple input-output (I/O) interfaces (not shown). The memory may comprise fast read/write memory for holding processor data and instructions while operating, and nonvolatile memory such as electrically erasable programmable read-only memory (EEPROM) and/or Flash for storing files and system startup information. One of I/O interfaces may be a wired interface that is typically one or more IEEE 802.3 Ethernet interfaces, used for wired connections to other network devices including the aggregating device. Another of the I/O interfaces may be a wireless interface that is typically one or more radios operating on different frequency bands (e.g., 2.4 gigahertz "GHz" and 5 GHz).

Aggregating device 150 and MSP 160 are similar purpose-built network devices containing a similar hierarchy of one or more processor, memory, and input-output interfaces. Also, client device 130 is a mobile network device that contains a processor, memory, a display, a wireless interface, and other interfaces as needed.

According to one embodiment of the disclosure, each edge device 100, 110 and/or 120 maintains a client table (not shown), the contents of which may be shared with network device 160 or even shared among the different edge devices for a particular network. For instance, AP $110_1$-$110_a$ may upload client metrics associated with detected wireless signaling from client device 130 to network device 160. Similarly, cellular base stations $110_1$-$110_b$ and WiMax™ base stations $120_1$-$120_c$ may share received client metrics, respectively.

It is contemplated that such client metrics may be obtained through passive scanning where, at certain times, the edge devices 100, 110 and/or 120 may scan for signaling present on various wireless frequency bands/channels and cellular frequency bands/channels. Alternatively, the client metrics may be obtained through active scanning, where the network device 160 or another network device may request one or more edge devices 100, 110 and/or 120 to transmit messages to solicit a response from a targeted client device or responses from client devices operating on a particular wireless frequency band/channel or a particular cellular frequency band/channel.

An illustrative embodiment of the client table 200 is shown in FIG. 2. The client table 200 in one of the edge devices (e.g. AP $100_a$) may be of limited size, for example 128 entries, with entries aged out as the table 200 fills. Upon detection of a new client device, as identified by a client MAC address, an entry 210 is added to the client table 200. An example of entry 210 includes at least a client Media Access Control (MAC) address 220 and signal strength 230 measured for a received message. Other information such as a timestamp 240, channel 250, frequency band 260, session type 270 for the current communications (e.g., video, audio, text & images, etc.), and application type (or classification) 280 targeted for processing of the data associated with the session (e.g., travel-based application such as GOOGLE® Maps, APPLE® Maps, any electronic email (email) application, any instant messaging application, any social media application such as Twitter®, ticket scanning/display application, etc.). If the client MAC address 220 already existed in the table 200, the entry for that client MAC address may be updated accordingly, where prior values may be deleted or stored elsewhere in the client table 200 or separate therefrom.

The report message 170 may also contain specific information 290 associated with the edge device including, but not limited or restricted to edge device capabilities, Basic Service Set Identifier (BSSID) or cellular-based identifier, or the like. As shown, specific information 290 may be stored as part of an appropriate entry in the client table 200 or may be stored separately.

Referring to FIGS. 1A-1B and 3A, according to this embodiment of the disclosure, each edge device 100, 110 and/or 120 sends its newly stored client metrics back to the aggregating device 150 via report message 170. As an example, this may occur periodically, such as every "q" seconds ($q \geq 1$) for example. Of course, the client metrics may be transmitted in an aperiodic manner, where the transmission may be triggered by one or more events, such as an update or addition to the client table 200, or a combination of time and events. Also, the client metrics may be provided to the aggregating device 150 via authentication servers on different networks as shown in FIG. 3B.

This client reporting process is repeated by each of the edge devices 100, 110 and 120 for each of the heterogeneous networks.

Referring back to FIGS. 1A and 1B, a network management process 180 is hosted by the network device 160. As shown, for illustrative purposes, the network device 160 is a server that manages access to multiple heterogeneous networks such as both WiFi™ and cellular networks. Alternatively, the network management process 180 may be hosted locally on another network device such as one or more edge devices $100_1, \ldots, 100_a, 110_1, \ldots, 110_b, 120_1, \ldots, 120_c$, provided such hosted edge devices are communicatively coupled to each other. The location of the network management process 180 does not matter so long as it is capable of receiving client metrics contained within report messages 170 from edge devices 100, 110 and 120.

Upon detecting of a triggering event in response to the detected level of connectivity falls below prescribed threshold(s), the network device 160 routes a management message 190 for controlling network connectivity of a particular client device under analysis. As an illustrative example, the management message 190 may be adapted to cause aggregating device 150 to generate a control message 195 (e.g. a blacklist message) that subsequently instructs various edge devices to avoid responding to a request by the client device for establishing a connection. As an alternative embodiment, the management message 190 may be adapted to cause aggregating device 150 to generate the control message 195 being a whitelist message that subsequently instructs one or more of the edge devices that they are permitted to respond to such connection requests.

Figure 3C:
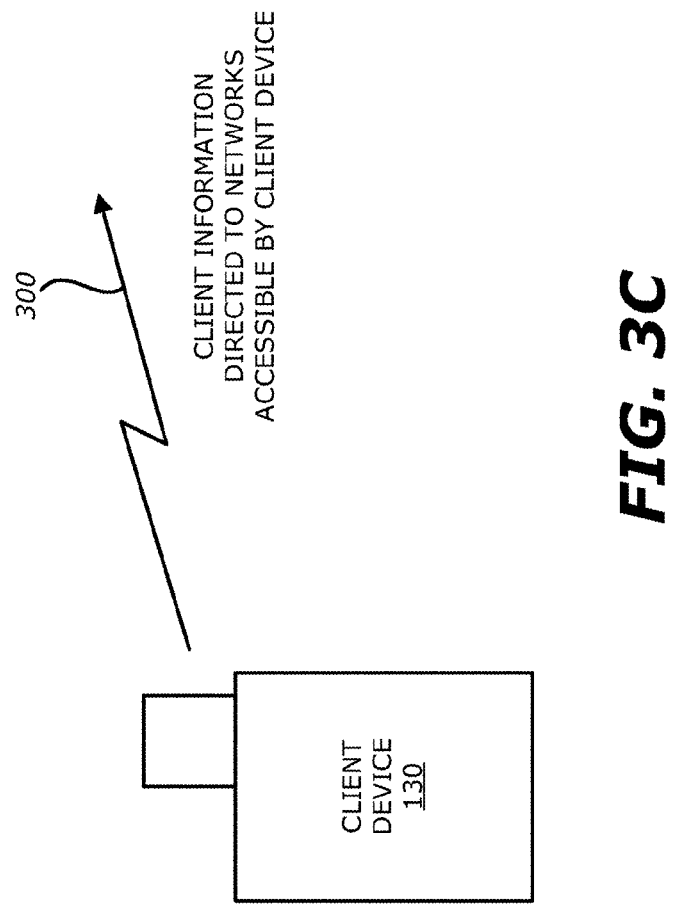
FIG. 3C is a third exemplary embodiment of the communicative coupling where the client device 130 may be adapted to upload client metrics.

Herein, the aggregating device 150 is described as collecting report messages from different network devices associated with different networks and aggregates the client metrics within the report messages for uploading to the network device 160. Of course, as shown in FIG. 3C, it is contemplated that the client device 130 may be adapted to upload a message 300 that includes its client metrics as well as information associated with the networks to which the client device 130 is able to access.

IV. Network Connectivity Schemes

As described above, the collection of client metrics at multiple edge devices and assimilation of the client metrics and network metrics spanning across different heterogeneous networks has been described. This section describes "steering" the client device, such as a session of the client device for example, to the best radio access link, which may occur from matching application requirements to current radio link properties. Herein, according to one embodiment of the invention, a network device (e.g. MSP 160) monitors connectivity levels for the client device associated with different networks. One of these connectivity levels may be based on client metrics provided by one of the edge devices of a first network to which the client device is currently connected. Another one of these connectivity levels may be based on client metrics produced from monitored signaling from the client device that are provided by one or more edge devices associated with a second network different from the first network.

Upon detecting anomalous behavior by a client device through analysis of the connectivity levels, which results in a triggering event being detected, the MSP operating alone, or in combination with another network device, influences the client device to transition from the first network to the second network. This transition may involve changing frequency bands and/or activating different logic within the client device where the networks are directed to different technologies. For instance, transmission from a first (WiFi™) network to a second (cellular) network may require the radio to be tuned to a different frequency band, increase radiation power, or the like.

According to one implementation, this network connectivity scheme is initiated by the MSP being a network device separate from the edge devices that is responsible for managing network connectivity. In another implementation, one of the edge devices (or at least an edge device associated with each type of network) may be configured to manage network connectivity by the client device, upon detecting anomalous behavior by the client device. The anomalous behavior may be directed, in part, to connection decisions by the client device that, after analysis, are determined to be causing reduced operability by the client device and/or the particular network.

Figure 4:
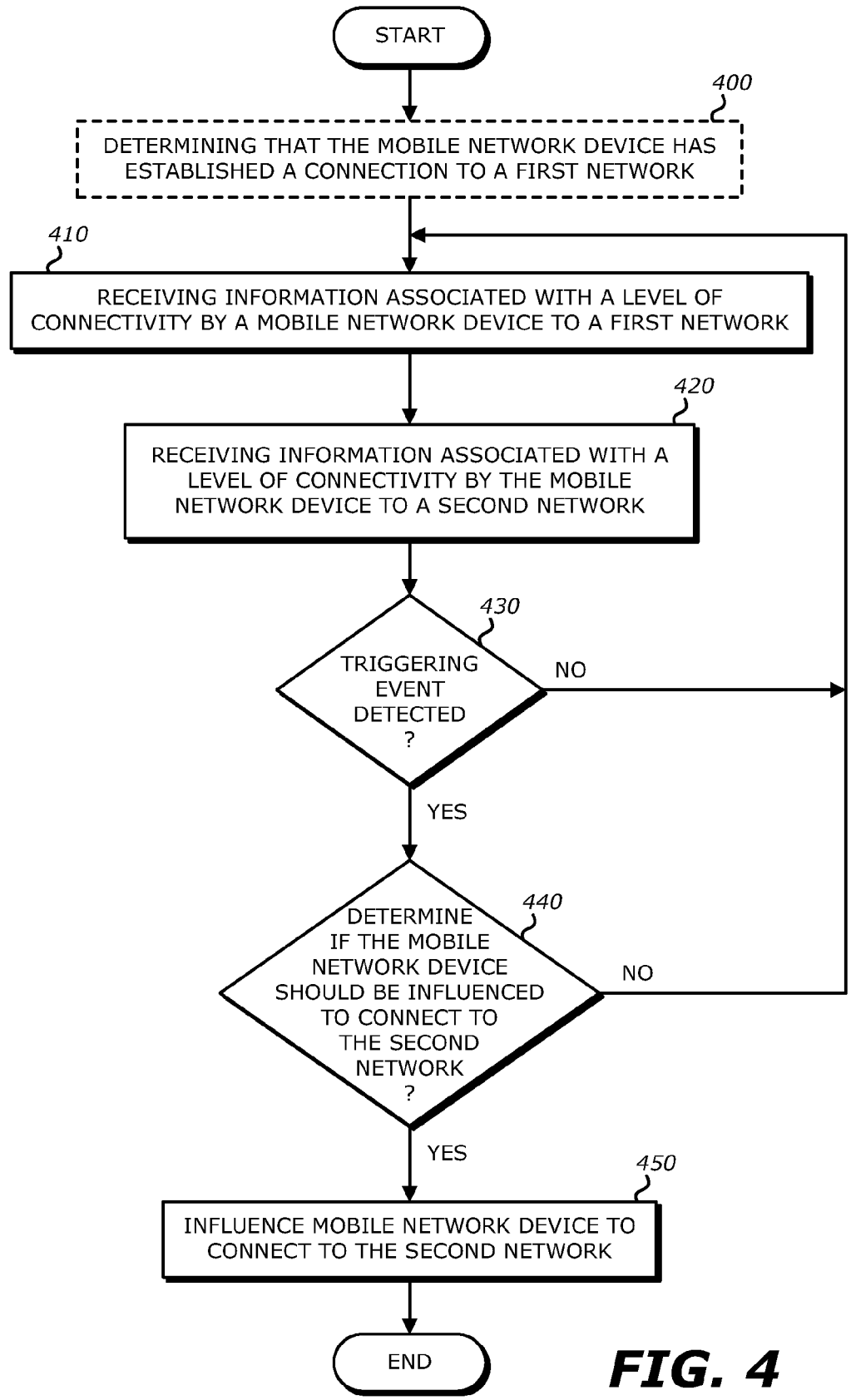
FIG. 4 is an exemplary embodiment of a first network connectivity scheme.

Referring now to FIG. 4, a network device (e.g., the MSP 160 of FIG. 1), after determining that a client device (e.g. mobile network device) has established a connection to a first network, receives information associated with a level of connectivity to the first network (blocks 400 and 410). The level of connectivity to the first network may be based on a variety of parameters, including one or more of connection metrics session metrics, application metrics, network metrics, and/or device metrics. Furthermore, the network device receives information associated with the level of connectivity to at least a second network, which may provide metrics associated with the mobile network device as monitored by one or more edge devices for the second network along with metrics associated with the second network itself (block 420).

According to one embodiment of the invention, the network device analyzes the level of connectivity to the first network to determine if a triggering event has occurred, where the triggering event denotes anomalous behavior by the mobile network device (block 430). Examples of triggering events that denote detection of anomalous behavior by the mobile network device are illustrated in FIG. 5. Alternatively, the triggering event may be detected by determining whether the connectivity of the mobile network device is in accordance with a connection policy, as described below and illustrated in FIG. 7.

For instance, a triggering event may be detected upon analysis of level of connectivity of the client device to the first network. For instance, as one example and illustrated in FIG. 5, determining whether or not a triggering event has occurred may be based on information associated with connection metrics provided to the MSP 160. As an example, the triggering event 500 may be detected when the signal strength (e.g., SNR, RSSI, etc.) for the current link to the first network falls below a prescribed threshold, which would denote that movement from the first network may be warranted. Alternatively, the triggering event 510 may occur upon analysis of the link characteristics, such as if the amount of available airtime, which is based on link speed, number of retries needed and link delays, falls below another prescribed threshold.

As also shown in FIG. 5, the triggering event 520 may be detected if the session type requires a QoS level that cannot be supported by the current link or the session is directed to an exchange of a particular data type that would be better supported by another type of network.

As further shown in FIG. 5, the triggering event 530 or 540 may be directed to network metrics that identify insufficient capacity (bandwidth) available for the first network or an overload condition occurs where the number of client devices connected to the first network exceeds a prescribed threshold.

In another illustrative example, a triggering event 550 may be detected upon determining the application type operating on the mobile network device that is currently accessing one of the plurality of networks. For instance, where the mobile network device is using an application directed to a specific functionality that normally requires a large coverage area, such as a driving map application for example, a triggering event may be detected if the first network is a WiFi™ network or another type of network with less expansive coverage area.

Referring back to FIG. 4, if no triggering event is detected (e.g., the current properties of the network connection for the client device is acceptable for current operations), the network device does not interfere with the current operating state of the client device. However, in the event that a triggering event has occurred, the network device may influence the mobile network device to connect to another network (blocks 440 and 450). Such influence may be based on whether (1) the triggering event is sufficient to warrant a change in network connectivity, and (2) such network connectivity is currently available to the mobile network device. Upon confirmation, the network device controls one or more edge devices to influence the change in network connectivity by the mobile network device.

Figure 6:
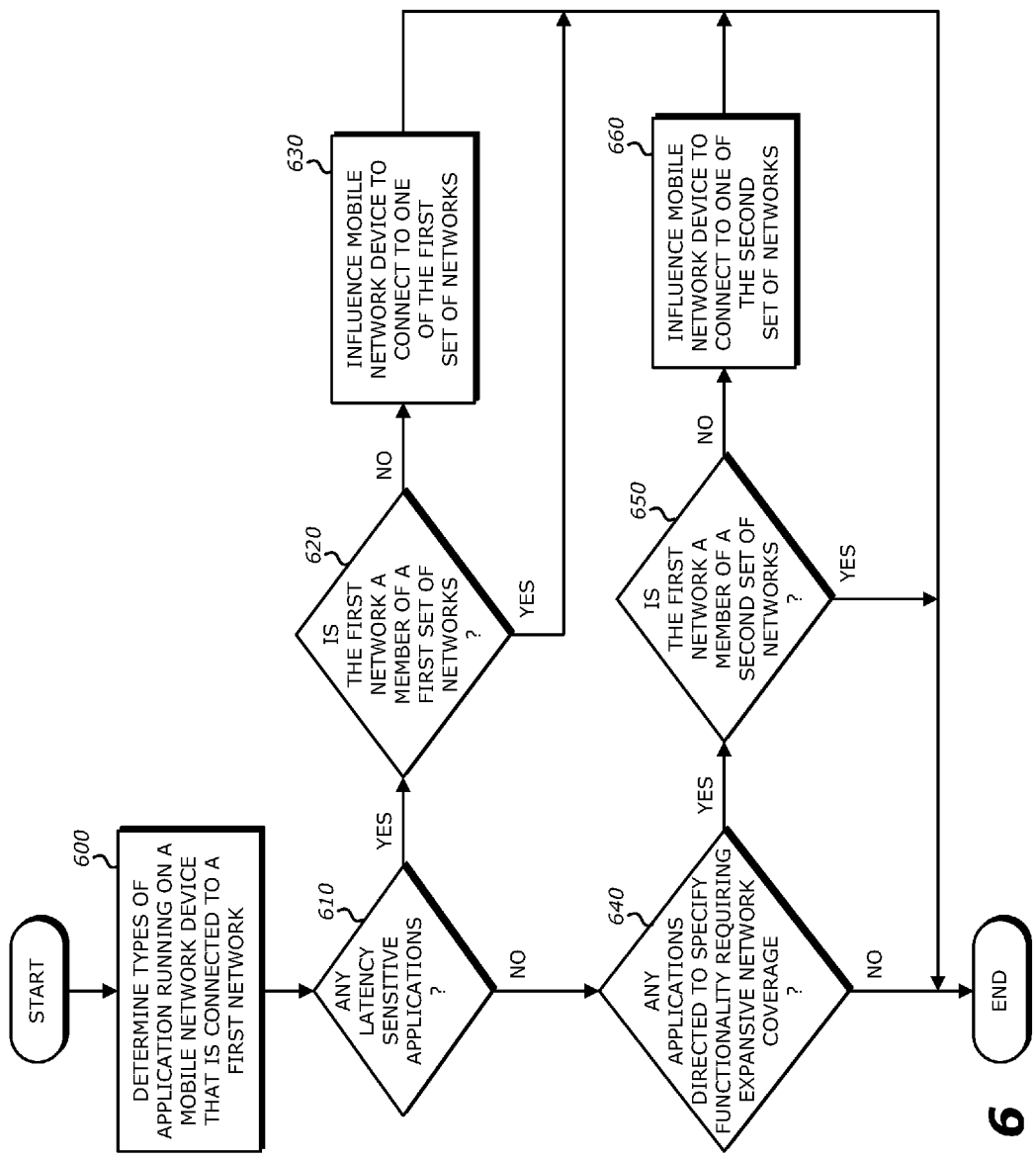
FIG. 6 is an exemplary embodiment of application layer steering associated with management of network connectivity.

Referring now to FIG. 6, an illustrative flowchart of application steering is described. Initially, a determination is made as to the type(s) of applications running on a client device, such as a mobile network device for example (block 600). Initially, the application(s) are communicatively coupled to the first network.

A first determination is made as to whether the application is a latency-sensitive application or not (block 610). A latency-sensitive application may be a classification in which the application has strict latency requirements, such as applications that are directed to real-time audio and/or video communications such as FaceTime®.

If the detected application is latency-sensitive, a subsequent determination is conducted as to whether the first network, namely the network utilized by the application, is a member of a first set of networks (block 620). This "first set of networks" is a listing of networks with low-latency requirements, which are better suited for such communications. For instance, a cellular network may be better suited for audio communications given strict latency compliance. If the first network is a member of the first set of networks, the process terminates (block 670). However, if the first network is not a member of the first set of networks, the mobile network device is steered to a network of the first set of networks that is currently accessible by the mobile network device (block 630).

If the detected application is not latency-sensitive, a second determination may be made as to whether the application is directed to specific functionality, such as travel-based application providing driving directions that requires expansive coverage for example (block 640). If the detected application is directed to the specific functionality, a subsequent determination would be whether the first network, namely the network utilized by the application, is a member of a second set of networks (block 650). This "second set of networks" is a listing of networks with larger coverage areas, which are better for such communications. For instance, a cellular network may be better suited for a travel-based application than an enterprise network. If the first network is a member of the second set of networks, the process terminates (block 670). However, if the first network is not a member of the second set of networks, the mobile network device is steered to a network of the second set of networks that is currently accessible by the mobile network device (block 660).

V. Network Grouping Schemes

Figure 7:
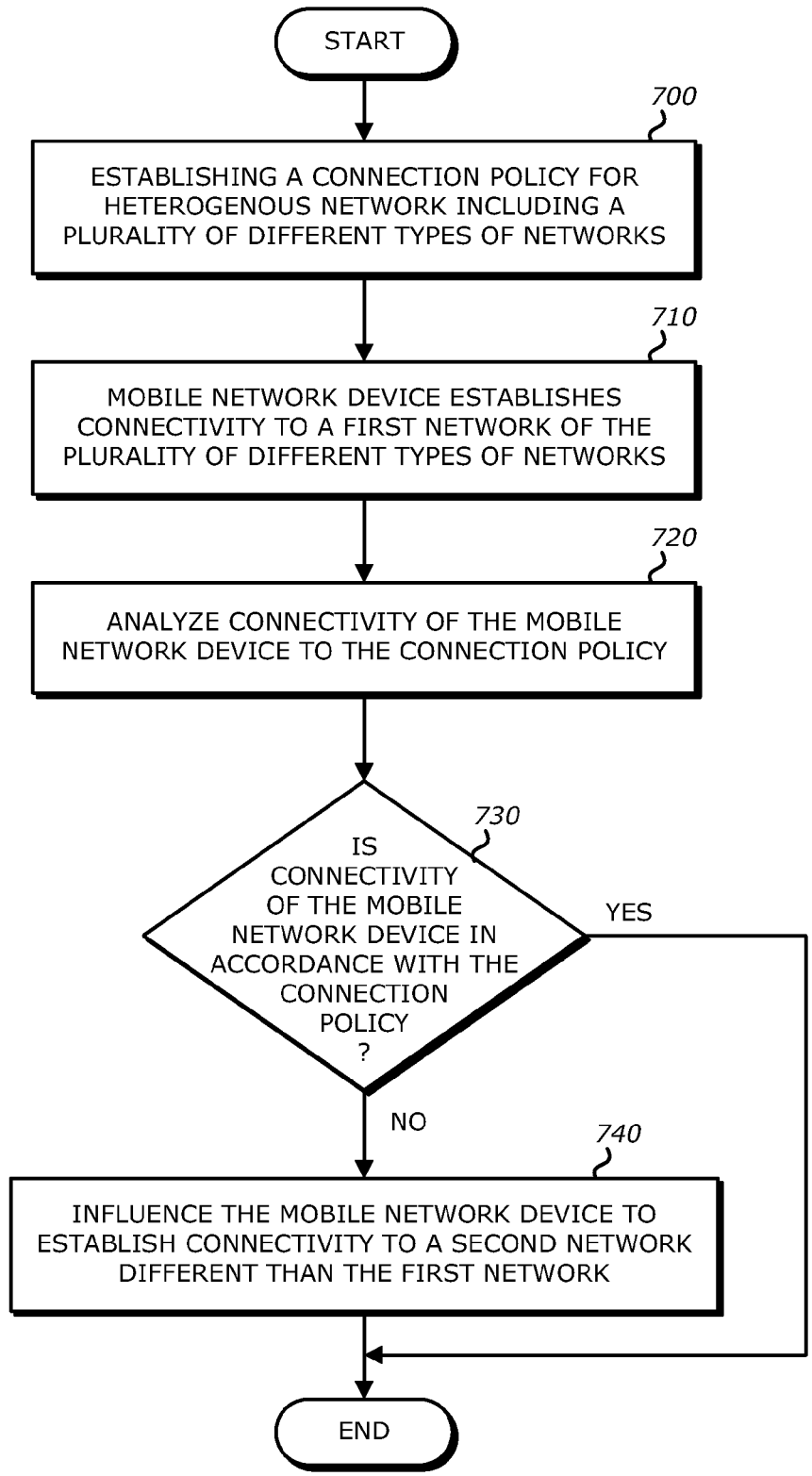
FIG. 7 is an exemplary embodiment of a second network connectivity scheme.

Referring to FIG. 7, an exemplary flowchart directed to another inventive aspect of the disclosure is described. The goal of the inventive aspect is that influencing of network connectivity by a client device, especially a mobile network device, is determined by the network, not the mobile network device. This would require a connection policy to be established for a plurality of heterogeneous networks including at least two different types of networks (block 700). Herein, as a default, the mobile network device establishes connectivity to a first network of the plurality of heterogeneous networks (block 710).

Thereafter, the connectivity of the mobile network device is analyzed with respect to compliance with the connection policy (block 720). If the connectivity of the mobile network device is in compliance with the connection policy, the mobile network device remains connected to the first network (blocks 730 and 750). However, if the connectivity of the mobile network device is not in compliance with the connection policy, a network device is adapted to influence the mobile network device to establish connectivity to a second network that is based on different technology than the first network (blocks 740 and 750).

Although not shown, as another alternative embodiment, the network device determines a desired operating state for a client device under analysis, where the client device is to transmit information for a particular session to a first network device of a first network such as a wireless network for example. Thereafter, the network device operates to detect if a triggering event has occurred based on a comparison of a desired operating state for the client device under analysis to an actual operating state for that client device under analysis. According to one embodiment, the actual operating state comprises the actual received signal strength of signals transmitted between the client device and the first device while the desired received signal strength constitutes a desired received signal strength of signals transmitted between the client device and the first device. According to one embodiment of the disclosure, the desired operating state (e.g. desired RSSI) may be preset based on a minimal RSSI (or SNR) needed for sustaining certain minimal bandwidth (e.g. PHY speed) depending on applications. Alternatively, the desired operating state for the client device comprises a desired operating state for the particular session.

In response to detecting that the triggering event has occurred, the network device causes the client device to initiate connectivity with the second network (e.g. a cellular network) and transmit information for one or more particular session(s) to a second network device of the second network.

It is contemplated that the client device is caused to transmit the information for the particular session to the second network device of the second network without modifying a configuration of the client device transmitting information for a second session to the first network device of the first network. It is further contemplated that the network device may cause the client device to transmit the information for the particular session to a second network device comprises reducing a performance associated with the first network for the particular session, or may select for a second session, one of the first network device or the second network device for the client device to transmit data corresponding to the second session.

In addition to network connectivity scheme, a network device (e.g. MSP 160) may be adapted to partition access to different networks by different sets of client devices, where each set of client devices includes one or more client device. According to one embodiment of the disclosure, such partitioning may be based on client metrics. For example, the network device may be adapted to receive client metrics from edge devices associated with different networks. From the client metrics, the network device can determine total capacity and/or load available for all of the networks, even networks based on different technologies (e.g. RF, cellular, etc.). The total capacity and/or load may be used by the network device for allocating certain sets of client devices among the different networks.

As an illustrative example, presume that an edge device for a first network provides client metrics that identify the remaining capacity for the first network is "A" bits per second (bps) while the remaining capacity for the second network is "B" bps. Hence, the network device 160 is able to compute that the remaining capacity for the heterogeneous networks is A+B. From this, the network device may partition A+B bps based on a selected grouping of the client devices. Such grouping (e.g. sets of client devices) may be based on load (e.g., number of client devices connected to each particular network) and/or device metrics such as device characteristics (e.g. device type, device manufacturer, radio type, etc.) and/or device capabilities such as transmit/receive speed, transport protocol, security features, network subscription level, or the like.

As another illustrative example, from the client metrics associated with each network, the network device may be adapted to formulate a performance value for different configuration groups. Based on a collection of current client metrics and/or heuristic data (e.g. previous client metrics), the performance value represents a performance level for the network. The performance value may be compared to a threshold value or a performance value for another configuration group to ascertain if the network, with the particular set of client devices, is operating at or above a targeted performance. The performance value may be based on one or more of the following metrics:

(1) connection metrics—actual or estimated airtime of signaling from the client device (current airtime or heuristics associated with prior sessions);

(2) session metrics—current or estimated types of data traffic from the client device, average bandwidth usage per session, QoS requirements for the session (3) application metrics—current application usage, predicted application usage based on heuristics, typical classification of running application (e.g., latency tolerant or intolerant, etc.); and/or (4) network metrics—network capacity, load associated with any desired granularity (e.g., network, edge device, channel, frequency band).

As an illustrative example, a first performance value for a first group configuration may be determined by the network device, where each of a group of client devices is provided access one or more resources via a respective selected network from a plurality of networks. Concurrently or subsequent to this determination, a second performance value is determined for a second group configuration, where at least one client device of the group of client devices accesses the one or more resources via a different network when configured in accordance with the second group configuration rather than when configured in accordance with the first group configuration. Based on the first performance value and the second performance value, the respective network is selected for each client device of the group of client devices.

It is contemplated that the first performance value may be based on various parameters. For instance, the performance values may be computed for each of the group of client devices. For instance, the first performance value may be based on a group throughput value computed using respective throughput values for each client device in the group of client devices while configured in accordance with the first configuration. Alternatively, the first performance value may be based on (i) a group connectivity value computed using respective connectivity values for each client device in the group of client devices while configured in accordance with the first configuration and/or (ii) a group dropped packet rate that is computed using respective dropped packet rates for each client device in the group of client devices while configured in accordance with the first configuration.

In other alternatives, the first performance value may be based on (1) performance values computed for each of the network devices providing the group of client devices access to the one or more resources, (2) a load balance distribution metric computed using respective load values for network devices in the plurality of networks, (3) a utilization metric computed using respective utilization values for network devices in the plurality of networks, and/or (4) both (a) respective performance values computed for each of the group of client devices and (b) performance values computed for each of the network devices providing the group of client devices access to the one or more resources.

As described herein, the plurality of networks comprises a WiFi™ network and a cellular network, where the first configuration may include a configuration of a first number of client devices from the group of client devices to access the one or more resources via the WiFi™ network and a second number of client devices from the group of client devices to access the one or more resources via the cellular network. Similarly, the second configuration may include a configuration of a third number of client devices from the group of client devices to access the one or more resources via the WiFi™ network and a fourth number of client devices from the group of client devices to access the one or more resources via the cellular network. According to an embodiment of the disclosure, the first number is different than the third number, and the second number is different than the fourth number.

Other embodiments of the disclosure may be considered. For example, one embodiment may be directed to a non-transitory computer-readable medium to store software that, when executed by one or more hardware processors, perform operations, comprising: (1) establishing a connection policy for a plurality of networks including at least a first network and a second network, the first network being a different type of network than the second network; (2) analyzing whether current connectivity of a client device to the first network is in compliance with the connection policy; and (3) based on results of the analysis of the current connectivity of the client device and the connection policy, influencing the client device to establish connectivity to the second network.

Furthermore, in accordance with the non-transitory computer-readable medium described immediately above, one or more of the following aspects may be present: (1) the first network is a wireless network and the second network is a cellular network; (2) the connection policy includes a signal strength threshold where the client device is influenced to establish connectivity to the second network if a signal strength for signaling received by an edge network device from the client device falls below the signal strength threshold for a prescribed number of measurements; (3) the connection policy applies a capacity threshold to at least the first network in order to influence the client device to establish connectivity to the second network if the capacity threshold has been exceeded; and (4) the software being executed by the one or more hardware processors to determine, prior to analyzing whether the current connectivity of the client device to the first network is in compliance with the connection policy, whether a signal strength for signaling to an associated edge network device falls below a signal strength threshold.

Lastly, it is noted that the functionality associated with the non-transitory computer-readable medium described above may be captured by a network device that includes at least one device including a hardware processor and the system configured to perform operations identical to the operations described for the computer-readable medium.

This invention may be embodied in other forms without departing from the spirit or essential attributes thereof. Accordingly, reference should be made to the following claims, rather than to the foregoing specification, as indicating the scope of the invention.

What is claimed is:

1. A non-transitory computer-readable medium to store instructions which, when executed by one or more hardware processors, cause the one or more hardware processors to:
   receive, by a network device, information associated with a level of connectivity by at least one client device to a first network;
   receive, by the network device, information associated with a level of connectivity by the at least one client device to a second network;
   receive, by the network device, aggregated information from an aggregating device including information associated with the at least one client device and at least one report message relating to a network that is associated with at least one edge device, wherein the at least one report message includes metrics formulated from signaling the at least one client device;
   based on an analysis of the aggregated information from the aggregating device, the level of connectivity with the first network and the level of connectivity with the second network: select, by the network device, the second network for the at least one client device to access one or more resources, wherein to select the second network, the instructions are further to cause the one or more hardware processors to determine that the at least one client device is capable of being communicatively coupled to both the first network and the second network based on the receipt of the information associated with the level of connectivity with the first network and the receipt of the information associated with the level of connectivity with the second network; and
   cause, by the network device, the at least one client device to connect to the second network.

2. The non-transitory computer-readable medium of claim 1, wherein the first network is a wireless network operating in accordance with an IEEE 802.11 standard and the second network is a cellular network.

3. The non-transitory computer-readable medium of claim 2, wherein to select the second network for the at least one client device, the instructions are further to cause the one or more hardware processors to, based on characteristics of the at least one client device, select the cellular network for connectivity with the at least one client device.

4. The non-transitory computer-readable medium of claim 2, wherein to select the at least one client device to establish connectivity to the cellular network the instructions are further to cause the one or more hardware processors to transition a first client device of the at least one client device from the wireless network to the cellular network based on a second client device establishing connectivity to the first network.

5. The non-transitory computer-readable medium of claim 2, wherein to select the second network for the at least one client device, the instructions are further to cause the one or more hardware processors to partition access to the first network and the second network for the at least one client device being a set of client devices, where the partitioning of the access of the set of client devices to the second network is based on at least one of a total network capacity for the first network and a total network capacity for the second network.

6. The non-transitory computer-readable medium of claim 2, wherein to select the second network for the at least one client device, the instructions are further to cause the one or more hardware processors to partition access to the first network and the second network for the at least one client device being a set of client devices, where the partitioning of the access of the set of client devices to the second network is based on a group connectivity value associated with at least one of the first network and the second network, wherein the group connectivity value is based on one or more of the following: connection metrics, session metrics, application metrics and network metrics.

7. The non-transitory computer-readable medium of claim 1, wherein prior to or concurrently with receiving information associated with the level of connectivity by the at least one client device to the first network, the instructions are further to cause the one or more hardware processors to receive information associated with a state of the at least one client device connected to the first network.

8. The non-transitory computer-readable medium of claim 1, wherein the level of connectivity for the first network comprises one or more of the following: (1) signal strength measurements of signaling from the at least one client device, and (2) link characteristics including an amount of requisite airtime for transmission of a prescribed amount of data based a speed of the link, a number of retries needed for transmission of the data and transmission delays caused by the link.

9. The non-transitory computer-readable medium of claim 1, wherein the information associated with the level of connectivity by the at least one client device to the first network comprises one or more of the following: (1) information that identifies at least one session currently being conducted between the at least one client device and the first network, and (2) information identifying one or more types of applications in operation during the at least one session.

10. The non-transitory computer-readable medium of claim 1, wherein the instructions are further to cause the one or more hardware processors to determine the level of connectivity with the first network based on a first set of signals transmitted by the at least one client device and received by at least one network device in the first network and the level of connectivity with the second network based on a second set of signals transmitted by the at least one client device and received by at least one network device in the second network.

11. A non-transitory computer readable medium comprising instructions, which when executed by one or more hardware processors, cause the one or more hardware processors to:
determine a desired operating state for a client device under analysis, the client device transmitting information for a particular session to a first network device of a first network;
receive aggregated information from an aggregating device including information associated with the at least one client device and at least one report message relating to a network that is associated with at least one edge device, wherein the at least one report message includes metrics formulated from signaling the at least one client device;
detect if a triggering event has occurred based on an analysis of the aggregated information from the aggregating device and a comparison of a desired operating state for the client device under analysis to an actual operating state for the client device under analysis; and
in response to detecting that the triggering event has occurred, cause the client device to transmit the information for the particular session to a second network device of a second network, wherein the instructions are further to cause the one or more hardware processors to determine that the at least one client device is capable of being communicatively coupled to both the first network and the second network based on the receipt of the information associated with the level of connectivity with the first network and the receipt of the information associated with the level of connectivity with the second network.

12. The non-transitory computer-readable medium of claim 11, wherein to cause the client device to transit instructions for the particular session to the second network device of a second network, the instructions are further to cause the one or more hardware processors to, responsive to detecting the triggering event, initiate connectivity between the client device and the second network device of the second network.

13. The non-transitory computer-readable medium of claim 11, wherein to cause the client device to transmit instructions, the instructions are further to cause the one or more hardware processors to, responsive to detecting the triggering event, cause the client device to transmit the information for all current sessions to the second network device of a second network.

14. The non-transitory computer-readable medium of claim 11, wherein the instructions are further to causer the one or more hardware processors to cause the client device to transmit the information for the particular session to the second network device of the second network without modifying a configuration of the client device transmitting information for a second session to the fist network device of the first network, the second session being a different session from the particular session.

15. The non-transitory computer-readable medium of claim 11, wherein the actual operating state comprises an actual received signal strength of signals transmitted between the client device and the first network device and the desired operating state comprises a desired received signal strength of signals transmitted between the client device and the first network device.

16. The non-transitory computer-readable medium of claim 11, wherein the desired operating state for the client device comprises a desired operating state for the particular session.

17. The non-transitory computer-readable medium of claim 11 wherein to cause the client device to transmit the information for the particular session to a second network device, the instructions are further to cause the one or more hardware processors to reduce a performance associated with the first network for the particular session.

18. The non-transitory computer-readable medium of claim 11, wherein the instructions are further to cause the one or more hardware processors to select for a second session, one of the first network device or the second network device for the client device to transmit data corresponding to the second session.

19. A system comprising:
a network device including one or more hardware processors;
a memory device including instructions that are to cause the one or more hardware processors to:
receive information associated with a level of connectivity by at least one client device to a first network;
receive information associated with a level of connectivity by the at least one client device to a second network;
receive aggregated information from an aggregating device including information associated with the at least one client device and at least one report message relating to a network that is associated with at least one edge device, wherein the at least one report message includes metrics formulated from signaling the at least one client device;
based on an analysis of the aggregated information from the aggregating device and the level of connectivity with the first network and the level of connectivity with the second network: select the second network for the at least one client device to access one or more resources, wherein to select the second network, the instructions are further to cause the one or more hardware processors to determine that the at least one client device is capable of being communicatively coupled to both the first network and the second network based on the receipt of the information associated with the level of connectivity with the first network and the receipt of the information associated with the level of connectivity with the second network;
cause the at least one client device to connect to the second network.

20. The system of claim 19, wherein the first network is a wireless network operating in accordance with an IEEE 802.11 standard and the second network is a cellular network.

21. The system of claim 20, wherein to select the second network for the at least one client device, the instructions are further to cause the one or more hardware processors to, based on characteristics of the at least one client device, select the cellular network for connectivity with the at least one client device.

22. The system of claim 20, wherein to select the at least one client device to establish connectivity to the cellular network, the instructions are further to cause the one or more hardware processors to transition a first client device of the at least one client device from the wireless network to the cellular network based on a second client device establishing connectivity to the first network.

23. The system of claim 20, wherein to select the second network for the at least one client device, the instructions are further to cause the one or more hardware processors to partition access to first network and the second network for the at least one client device being a set of client devices, wherein the partitioning of the access of the set of client devices to the second network is based on at least one of a total network capacity for the first network and a total network capacity for the second network.

24. The system of claim 20, wherein to select the second network for the at least one client device, the instructions are further to cause the one or more hardware processors to partition access to first network and the second network for the at least one client device being a set of client devices, where the partitioning of the access of the set of client devices to the second network is based on a group connectivity value associated with at least one of the first network and the second network,
wherein the group connectivity value is based on one or more of the following: connection metrics, session metrics, application metrics and network metrics.

25. The system of claim 19, wherein prior to or concurrently with receiving information associated with the level of connectivity by the at least one client device to the first network, the instructions are further to cause the one or more hardware processors to receive information associated with a state of the at least one client device connected to the first network.

26. The system of claim 19, wherein the level of connectivity for the first network comprises one or more of the following: (1) signal strength measurements of signaling from the at least one client device, and (2) link characteristics including an amount of requisite airtime for transmission of a prescribed amount of data based a speed of the link, a number of retries needed for transmission of the data and transmission delays caused by the link.

27. The system of claim 19, wherein the information associated with the level of connectivity by the at least one client device to the first network comprises one or more of the following: (1) information that identifies at least one session currently being conducted between the at least one client device and the first network, and (2) information identifying one or more types of applications in operation during the at least one session.

28. The system of claim 19, wherein the instructions are further to cause the one or more hardware processors to determine the level of connectivity with the first network based on a first set of signals transmitted by the at least one client device and received by at least one network device in the first network and the level of connectivity with the second network based on a second set of signals transmitted by the at least one client device and received by at least one network device in the second network.

* * * * *